Nov. 13, 1956                R. W. WAYMAN                2,770,326
                             BRAKE MECHANISM
Filed Aug. 3, 1950                                    2 Sheets-Sheet 1
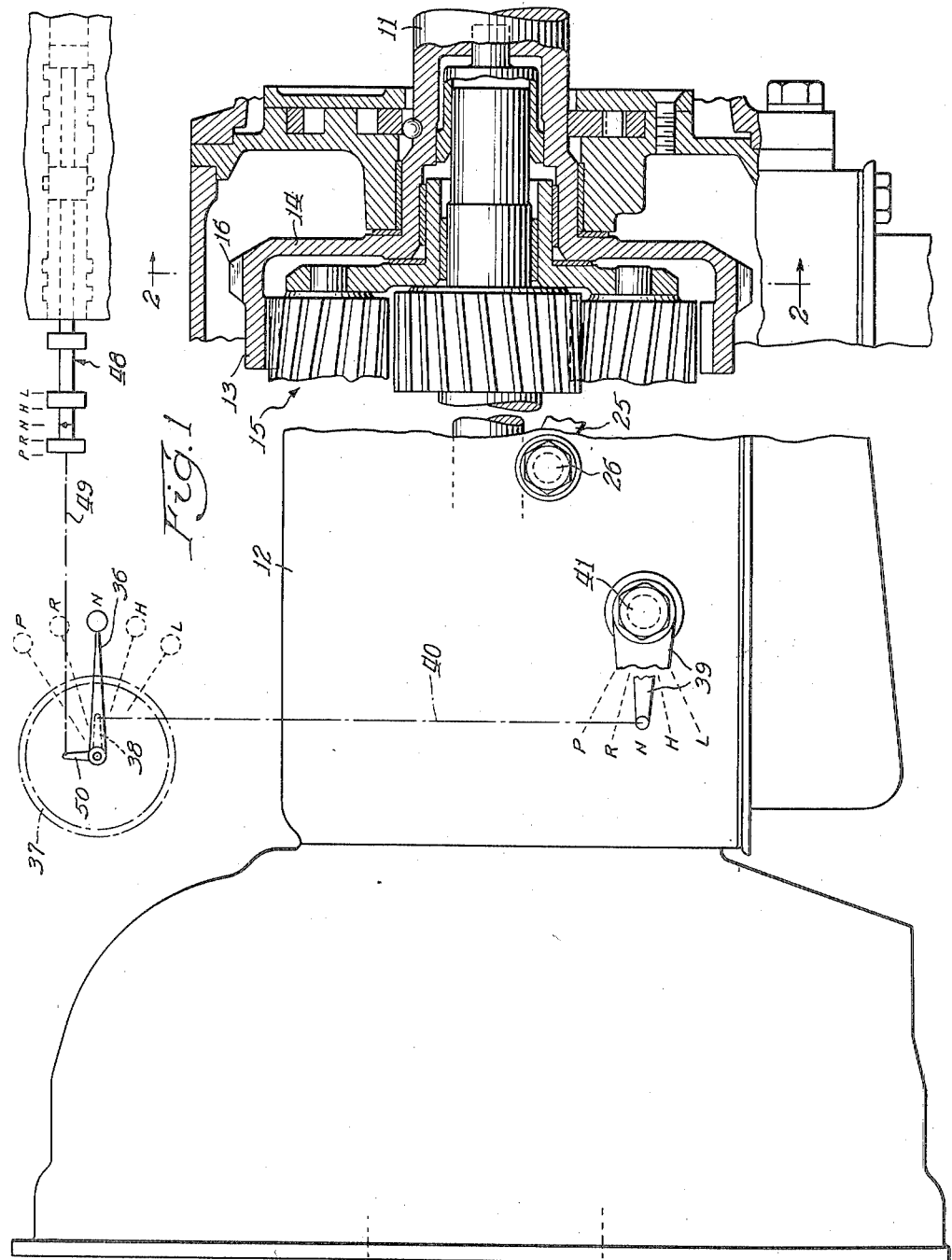
Inventor:
Robert W. Wayman Nov. 13, 1956                R. W. WAYMAN                2,770,326
                             BRAKE MECHANISM
Filed Aug. 3, 1950                                    2 Sheets-Sheet 2
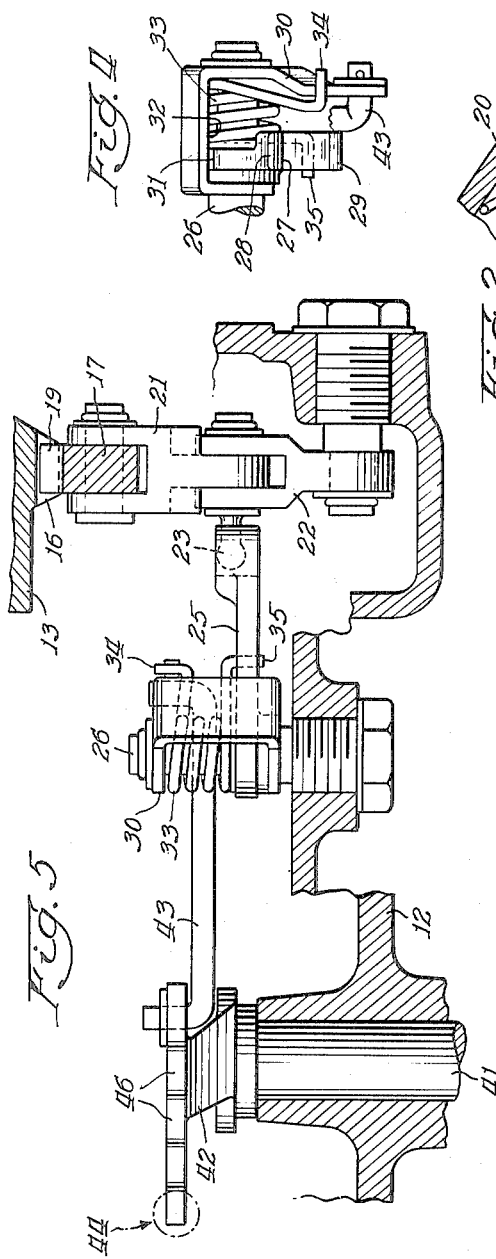
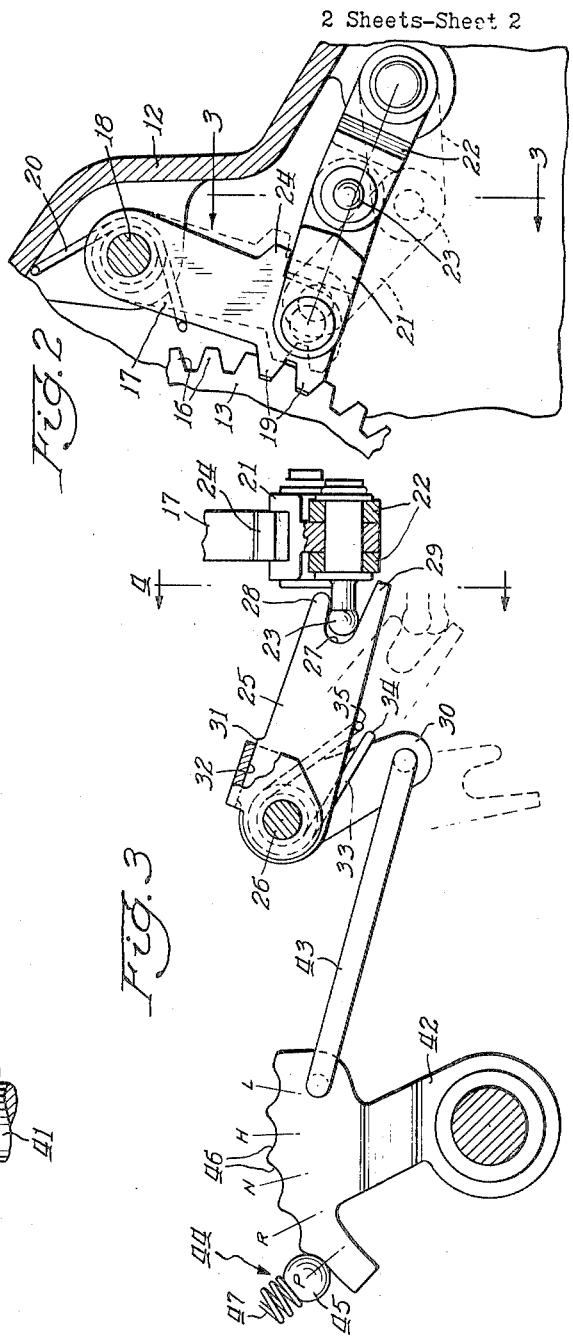
Inventor:
Robert W. Wayman United States Patent Office 2,770,326
Patented Nov. 13, 1956

2,770,326

BRAKE MECHANISM

Robert W. Wayman, North Riverside, Ill., assignor to Borg-Warner Corporation, Chicago, Ill., a corporation of Illinois Application August 3, 1950, Serial No. 177,471

5 Claims. (Cl. 188—69)

My invention relates to brake systems and more particularly to mechanisms for positively braking an automotive vehicle to prevent movement of the vehicle when drive is broken between the engine and driving wheels of the vehicle.

It is an object of the invention to provide an improved braking mechanism for a motor vehicle having positively interengaging elements for providing the braking effect when the elements are engaged. More particularly, it is an object to connect one of the interengaging elements with a manually operable selector lever so that the element is moved to engage with the other element when the selector lever is given a certain movement and with the connections between the lever and movable element including a lost motion mechanism which allows a complete movement of the selector lever without a corresponding complete movement of the movable element when it and the other element are in butt ended condition. It is also an object to provide improved mechanism for positively disengaging the movable element with respect to the other interengageable element when the selector is returned from its brake engaging position to a brake disengaging position.

It is another object to connect the manually operable selector lever with a variable speed transmission for controlling the transmission to condition it for various drives therethrough, with the arrangement being such that the movable interengageable brake element is out of engagement with the other interengageable brake element when the selector lever is in positions for providing a drive through the transmission.

The invention consists of the novel constructions, arrangements and devices to be hereinafter described and claimed for carrying out the above stated objects and such other objects as will appear from the following description of a preferred embodiment of the invention, illustrated with reference to the accompanying drawings, wherein:

Fig. 1 is a partial, sectional view of a transmission which includes a parking brake embodying the principles of the invention;

Fig. 2 is a partial, sectional view taken on line 2—2 of Fig. 1;

Fig. 3 is a sectional view taken on line 3—3 of Fig. 2;

Fig. 4 is a view taken on line 4—4 of Fig. 3; and

Fig. 5 is a top view of the braking mechanism as shown in Fig. 3.

Like characters of reference designate like parts in the several views.

The present invention in parking brakes is quite similar to the parking brake mechanism shown in my co-pending application, Borg-Warner Case No. 4956–ED, Serial No. 166,136, filed June 5, 1950, and this latter application may be referred to for various details of construction of the transmission mechanism which is only partially shown herein.

Referring now to the figures of the drawings, the transmission illustrated in Fig. 1 may be seen to comprise a drive shaft 10 adapted to be driven by the engine of the vehicle in which the transmission is installed and a driven shaft 11 adapted to be connected with the driving road wheels of the vehicle by any suitable mechanism (not shown). The shafts 10 and 11 are coaxially disposed with respect to each other and are rotatably disposed within a transmission casing 12. The driven shaft 11 is connected with a ring gear 13 formed within a bell shaped portion 14 of the shaft 11. The ring gear 13 constitutes part of a planetary gear set 15 in the transmission, and the ring gear 13 is the output member of the transmission which is adapted to be driven in a number of speed ratios from the drive shaft 10. The mechanism connecting the shaft 10 and the ring gear 13 and thereby the shaft 11 may be of any suitable construction and may for example, be of the construction shown in my co-pending application above referred to.

The brake mechanism of the present invention is effective for holding the driven shaft 11 and thereby the road wheels of the vehicle connected therewith from rotation when the brake mechanism is engaged. The brake mechanism comprises a series of teeth 16 formed on the bell shaped portion 14 of the driven shaft 11 and a sprag 17 swingably mounted with respect to the transmission casing 12 by means of a pin 18. The sprag has teeth 19 which are adapted to engage with the teeth 16. A spring 20 is disposed about the pin 18 and acts between the sprag 17 and the transmission casing 12 and tends to hold the sprag 17 out of engagement with the teeth 16.

A toggle linkage is provied for actuating the sprag 17 and moving it into engagement with the teeth 16. The toggle linkage comprises a link 21 pivotally connected at one end with the sprag 17 and a link 22 pivotally mounted at one end with respect to the transmission casing 12. The links 21 and 22 are pivotally connected at their other ends by means of a round ended pin 23. The sprag 17 has a lug 24 on one side which limits pivotal movement of the link 21 about its connection with the sprag 17 for purposes to be described.

The pin 23 is moved by means of a lever 25 pivotally mounted with respect to the transmission case 12 by means of a shaft 26. The pin 23 is movable in a slot 27 in the end of the lever 25 which is formed by tangs 28 and 29 of unequal length. Another lever 30 is swingably mounted on the shaft 26, and the levers 25 and 30 have respective coacting portions 31 and 32. A spring 33 is disposed about the shaft 26 and has ends 34 and 35 respectively in contact with the levers 30 and 25.

The lever 30 is connected to be actuated from the ordinary selector lever 36 which is located immediately beneath the vehicle steering wheel 37 and is adapted to condition the transmission for various drives through it by mechanism which will hereinafter be described. The selector lever 36 is connected with a lever 38 so that the levers 36 and 38 rotate together, and the lever 38 is connected with a lever 39 located on the exterior on the transmission casing 12 by any suitable means such as a link 40. The lever 39 is fixed on a shaft 41 extending through the transmission casing 12, and the shaft 41 has fixed thereto a lever 42 located inside the transmission case. The levers 30 and 42 are connected by means of a link 43.

Detent mechanism of any suitable type may be associated with the lever 42 for yieldably holding the lever and the connected selector lever 36 in a plurality of different positions. The detent mechanism 44 which is illustrated comprises a ball 45 adapted to fit in any of a plurality of notches 46 provided in the periphery of the lever 42. A spring 47 is provided for yieldably holding the ball 45 in any of the notches 46.

The transmission is adapted to be conditioned for various types of operation, for example, "H" or high range forward drive, "L" or low range forward drive, "N" or neutral condition and "R" or reverse drive by means of a control element 48 connected by means of a link 49 and a lever 50, for example, with the selector lever 36, and each of the levers 36, 38, 50, 39 and 42 have a position corresponding to each of these types of operation as well as to a "P" or parking condition.

The selector lever 36 is effective to engage the parking brake comprising the teeth 16 and the sprag 17 when the selector lever 36 and thereby the control member 48 are moved to their positions which are indicated "P" in the drawings from their "N" or "R" positions. The lever 36 when thus moved rotates the lever 42 in the clockwise direction as seen in Fig. 3 by means of the link 40 and levers 38 and 39. The lever 42 is connected by means of the link 43 with the lever 30 and thus rotates the latter lever in the counterclockwise direction as seen in Fig. 3. The spring 33 is effectively between the lever 30 and the lever 25 and causes a similar movement of the lever 25 through the action of the spring. The pin 23 slidably fits in the slot 27 in the end of the lever 25 as shown, and this movement of the lever 25 moves the pin 23 upwardly as seen in Fig. 3. The links 21 and 22 are thereby moved so as to bring them into a straight line between their pivotal connections with the sprag 17 and case 12 and to move them upwardly slightly out of a straight line, with the center of the pin 23 moving over and above the center line joining the points of connection of the links 21 and 22 with the sprag 17 and case 12 to a position substantially as shown in Fig. 2. The sprag 17 by the straightening out movement of the links 21 and 22 is swung clockwise as seen in Fig. 2 about its pivot pin 18 toward the teeth 16 to engage the teeth 16 with the sprag teeth 19. The parking brake is thus engaged and functions to hold the driven shaft 11 of the transmission and thereby the driven road wheels of the vehicle (not shown) stationary.

It will be noted that the lever 25 is rotated through the action of the spring 33 from the lever 30, and thus if there should be a butt ending condition of the teeth 19 with respect to the teeth 16, there will not be a complete movement of the sprag 17 and lever 25 until the driven shaft 11 is rotated slightly to relieve the butt ended condition. The levers 30 and 25 have in effect a resilient lost motion connection between them which allows a complete movement of the lever 30 without a complete movement of the lever 25 when a butt ended condition exists, and the spring 33 functions to complete the engaging movement of the sprag 17 when the butt ended condition is relieved. The detent mechanism 44 functions to yieldably hold the selector lever 36 in any of its positions including its "P" position with the ball 45 being held in the corresponding notch 46 in the lever 42 by means of the spring 47. The lug 24 functions to limit the brake engaging movement of the links 21 and 22 and pin 23 as is apparent.

The parking brake may be disengaged by moving the selector lever 36 back out of its "P" position to its "R" or "N" position. The levers 39, 42 and 30 are rotated in the reverse directions, and the surface 32 on the lever 30 will engage the surface 31 on the lever 25 and will positively move the latter lever so as to move the pin 23 downwardly as seen in Fig. 3 and release the toggle linkage to pull the sprag 17 out of mesh with the teeth 16 on the ring gear 13. This movement of the sprag 17 is with the assistance of the spring 20 as will be understood. The parking brake is thus disengaged.

It should be noted that the teeth 16 and the sprag teeth 19 are of tapered configuration (Fig. 2) and arranged to interfit. Therefore, the abutting surfaces of the engaged teeth act as cam surfaces to induce a disengaging force on the sprag when the vehicle tends to move with the parking brake engaged. Hence, all of the brake locking effect is provided by the toggle linkage, and there will be no tendency for the sprag and the control lever to stick in the "P" condition regardless of the force tending to move the vehicle.

The transmission is conditioned for its various drives by moving the control member 48 into any of its "R" "H" or "L" positions as indicated in the drawings. The control member 48 is given this movement by means of the selector lever 36 and the lever 50 which rotates with the selector lever, and in moving the control member 48 to the right as seen in Fig. 1 to condition the transmission for any of its drives, the lever 25 is rotated clockwise as seen in Fig. 3, as has been explained, so as to pull the pin 23 downwardly and move the sprag 17 counterclockwise as seen in Fig. 2 to disengage its teeth 19 from the teeth 16. As the selector lever 36 is moved so as to bring the control member 48 into any of its "N" "H" or "L" positions, the lever 25 moves so as to separate itself from the pin 23 and completely disengage itself with respect to the pin, as is shown in dotted lines in Fig. 3. When the selector lever 36 is again returned, moving the control member 48 back towards its "P" position, the long tang 29 will engage the rounded pin 23, so that the pin again enters the slot 27, and the toggle linkage is again moved over-center to engage the teeth 19 with the teeth 16. The spring 20 functions to hold the sprag 17 disengaged with respect to the teeth 16 when the lever 25 is disengaged from the pin 23.

My improved parking brake mechanism advantageously includes the spring 33 which is effective for urging the engaging teeth 19 and 16 into engagement and allows a full movement of the selector lever 36 to its "P" position without corresponding complete movement of the sprag 17 when the teeth 19 and 16 are butt ended. The toggle linkage comprising the links 21 and 22 are moved into over-center position for effectively taking the thrust due to the teeth on the ring gear 16 which has a tendency to move when the vehicle has a corresponding tendency. The pin 23 and slot 27 provides a disengageable connection between the lever 25 and the toggle linkage so that the selector lever 36 may be moved into its "N" "H" or "L" positions without corresponding movement of the sprag 17, and in this case the spring 20 holds the sprag 17 out of engagement with the teeth 16. The surfaces 32 and 31 on the levers 30 and 25 provide a positive disengagement of the sprag 17 from the teeth 16 when the lever 36 is moved out of its "P" position toward its "R" position.

I wish it to be understood that my invention is not to be limited to the specific constructions and arrangements shown and described except only insofar as the appended claims may be so limited, as it will be apparent to those skilled in the art that changes may be made without departing from the principles of the invention.

I claim:

1. In brake mechanism, the combination of a rotatable toothed element, a sprag movable toward and away from the rotatable element and adapted to engage the latter, a manually operable control, a toggle linkage comprising two links having a pivotal connection at ends of each and one of said links being connected at its other end with said sprag and the other link being pivotally connected at its other end with a stationary member, a pin on said first pivotal connection, and a lever connected to be moved by said manually operable control and having surfaces defining a generally U-shaped opening on its end for receiving said pin whereby to move the pivoted links in one direction to engage said sprag on movement of said manually operable control in one direction and whereby to move the pivoted links in another direction to disengage said sprag and to disengage said slot from said pin on movement of said manually operable control in another direction.

2. In brake mechanism, the combination of a rotatable toothed element, a sprag movable toward and away from the rotatable element and adapted to engage the latter, a manually operable control, a toggle linkage for moving said sprag and comprising two links having a pivotal interconnection together at ends of the links and one of the links having a pivotal connection at its other end with said sprag and the other link having a pivotal connection at its other end with a stationary member, a pin carried by said interconnection between said links, a lever connected to be moved by said manually operable control and having a slot for receiving said pin whereby for moving the toggle linkage over-center to engage said sprag with said rotatable element on a movement of said manually operable control and moving said toggle linkage back to disengage said sprag and disengaging its slot from said pin on a reverse movement of said manually operable control, and a spring effective on said sprag for yieldably holding the sprag out of engagement with said rotatable toothed element when said lever is disengaged from said pin.

3. In brake mechanism, the combination of a rotatable toothed element, a pivoted sprag having a free end movable toward and away from the rotatable element and adapted to engage the latter, a manually operable control movable from a brake engaging position to a brake releasing position and movable beyond the latter position, a toggle linkage comprising two links having an interconnection therebetween at ends of each link and, one of said links on its other end having a pivotal connection with said sprag and said other link on its other end having a pivotal connection with a stationary member, a pin carried by said pivotal interconnection between said links, a first lever having a slot on its free end engageable with said pin, a second lever coaxially mounted with respect to said first lever, a spring between said first and second levers, means connecting said second lever with said manually operable control whereby when said manually operable control is moved to its brake engaging position from its brake releasing position it moves said second lever and said first lever is moved by said spring so as to move said toggle linkage over-center and engage said sprag with said rotatable element, an abutment means on said first and second levers whereby when said manually operable control is moved from its brake engaging position to its brake releasing position said second lever positively moves said first lever and thereby positively moves said toggle linkage and said sprag to a brake disengaging position of the latter, said slot allowing said first lever to completely separate from said pin when said manually operable control is moved beyond its brake releasing position, and a spring effective on said sprag for yieldably holding the sprag out of engagement with said rotatable toothed element when said first lever is separated from said pin.

4. In brake mechanism, the combination of a rotatable toothed element, a pivotally mounted sprag movable toward and away from the rotatable element and adapted to engage the latter to brake it, a manually operable control lever swingable to a brake engaging position and a brake releasing position, means connecting said control lever and said sprag for moving the sprag by movement of said control lever and including first and second coaxially mounted levers the first one being connected to be moved by said manually operable control lever and the second one being detachably connected to move with said sprag upon movement of said control lever to brake engaging position, said second lever disengaging from said sprag upon movement of said control lever to brake releasing position, and a spring effectively between said coaxially mounted levers for transferring movement of said first lever to said second lever for moving said sprag into engagement with said toothed element when said manually operable control lever is moved to its brake engaging position, said first lever having a portion abutting said second lever when said first lever is moved by movement of said manually operable control lever into its brake releasing position for positively moving said second lever and said sprag out of engagement with said toothed element.

5. In brake mechanism, the combination of a rotatable toothed element, a sprag movable to engage said rotatable element to brake it, a manually operable control having a brake engaging position and a brake releasing position, means for engaging and disengaging said sprag including overcenter toggle means pivoted at one of its ends to said sprag and at its other end to a fixed support and disengageable means disposed between said control and said toggle means, said disengageable means comprising a pair of spaced tangs of unequal length together defining a generally U-shaped slot and a pin connected to said toggle means intermediate its said pivoted ends.

References Cited in the file of this patent

UNITED STATES PATENTS

| | | |
|---|---|---|
| 1,346,949 | Gibson et al. | July 20, 1920 |
| 1,425,233 | Bolger | Aug. 8, 1922 |
| 1,498,940 | Wheeler | June 24, 1924 |
| 1,503,405 | Wheeler | July 29, 1924 |
| 1,798,808 | Potter | Mar. 31, 1931 |
| 1,946,062 | Cramp | Feb. 6, 1934 |
| 1,964,308 | Benario | June 26, 1934 |
| 1,983,726 | Adams | Dec. 11, 1934 |
| 2,021,574 | Cottrell | Nov. 19, 1935 |
| 2,100,970 | MacMullen | Nov. 30, 1937 |
| 2,121,869 | Greenawalt | June 28, 1938 |
| 2,437,314 | Berndtson | Mar. 9, 1948 |
| 2,670,064 | Hasbany | Feb. 23, 1954 |

FOREIGN PATENTS

| | | |
|---|---|---|
| 537,328 | France | May 20, 1922 |
| 449,838 | Italy | July 4, 1949 |

OTHER REFERENCES

Automotive Transmission: Automotive Industries, vol. 102, issue I, pp. 40–45 incl., published Jan. 1, 1950.